US011253947B2

(12) United States Patent
Kushihara et al.

(10) Patent No.: US 11,253,947 B2
(45) Date of Patent: Feb. 22, 2022

(54) MAGNET WIRE BONDING METHOD AND BONDING STRUCTURE

(71) Applicant: TAMAGAWA SEIKI CO., LTD., Nagano-ken (JP)

(72) Inventors: Hiroshi Kushihara, Nagano-ken (JP); Kazuyuki Ishibashi, Nagano-ken (JP); Hirofumi Maruyama, Nagano-ken (JP); Shinichi Arai, Nagano-ken (JP); Toshiki Muramatsu, Nagano-ken (JP); Shinichi Hara, Nagano-ken (JP); Katsutoshi Toyotake, Nagano-ken (JP)

(73) Assignee: TAMAGAWA SEIKI CO., LTD., Nagano-Ken (JP)

( * ) Notice: Subject to any disclaimer, the term of this patent is extended or adjusted under 35 U.S.C. 154(b) by 218 days.

(21) Appl. No.: 16/452,814

(22) Filed: Jun. 26, 2019

(65) Prior Publication Data

US 2020/0061735 A1 Feb. 27, 2020

(30) Foreign Application Priority Data

Aug. 27, 2018 (JP) .............................. JP2018-158142

(51) Int. Cl.
| | | |
|---|---|---|
| *H01R 11/30* | (2006.01) | |
| *B23K 20/00* | (2006.01) | |
| *H01R 43/02* | (2006.01) | |
| *H01R 13/62* | (2006.01) | |

(52) U.S. Cl.
CPC ....... *B23K 20/004* (2013.01); *H01R 13/6205* (2013.01); *H01R 43/0207* (2013.01)

(58) Field of Classification Search
CPC .............. B23K 20/004; H01R 13/6205; H01R 43/0207
See application file for complete search history.

(56) References Cited

U.S. PATENT DOCUMENTS

| | | | | |
|---|---|---|---|---|
| 3,171,091 | A * | 2/1965 | Goldsmith | ............ H01F 27/022 336/83 |
| 3,926,493 | A * | 12/1975 | Wakabayashi | ..... H01R 13/6205 439/39 |
| 4,963,435 | A * | 10/1990 | Hara | .................... C09D 175/04 428/375 |

(Continued)

FOREIGN PATENT DOCUMENTS

| | | |
|---|---|---|
| JP | 8-7953 | 1/1996 |
| JP | 2002-300745 | 10/2002 |
| JP | 2016-54589 | 4/2016 |

*Primary Examiner* — Thanh Tam T Le
(74) *Attorney, Agent, or Firm* — Wenderoth, Lind & Ponack, L.L.P.

(57) ABSTRACT

The present invention relates to a magnet wire bonding method and a bonding structure, and more particularly to a new improvement for ultrasonically bonding a longitudinal outer peripheral surface of a magnet wire having no entangling part to a flat surface of a flat part of a terminal pin. A magnet wire bonding method and structure, comprising: using a terminal pin (11) having a flat plate part (40) provided in a pin part (11*a*) as a terminal pin holding part (3); placing a magnet wire (13) in a longitudinally spread state on a flat surface (40*a*) of the flat plate part (40) without being entangled; and ultrasonically bonding an outer peripheral surface (13E) of the magnet wire (13) onto the flat surface (40*a*) with an ultrasonic horn (50).

2 Claims, 7 Drawing Sheets

(56) References Cited

U.S. PATENT DOCUMENTS

| | | | | |
|---|---|---|---|---|
| 6,217,339 B1* | 4/2001 | Tsubata | .................. | G04C 10/00 |
| | | | | 439/38 |
| 7,025,597 B1* | 4/2006 | Chang | .................. | H01R 11/287 |
| | | | | 439/39 |
| 7,052,283 B2* | 5/2006 | Pixley | .................... | H01R 24/42 |
| | | | | 336/92 |
| 7,963,773 B2* | 6/2011 | Palli | .................... | H01R 13/6205 |
| | | | | 439/38 |
| 8,800,846 B2* | 8/2014 | Nikkhoo | ................ | B23K 20/10 |
| | | | | 228/110.1 |
| 8,936,472 B1* | 1/2015 | Gibboney, Jr. | ........ | H01R 13/64 |
| | | | | 439/39 |
| 9,671,665 B2* | 6/2017 | Brown | .................. | G02F 1/1345 |
| 9,793,222 B1* | 10/2017 | Lee | ..................... | H01L 21/6835 |
| 9,972,929 B2* | 5/2018 | Fernandes | ................. | H01F 7/04 |
| 10,058,952 B2* | 8/2018 | Seok | ........................ | B23K 20/26 |
| 10,863,780 B2* | 12/2020 | Athauda | ................ | H01R 43/04 |
| 2012/0024089 A1* | 2/2012 | Couey | .................. | B23K 20/004 |
| | | | | 73/865.8 |

\* cited by examiner (FIRST PRIOR CONSTRUCTION)

(SECOND PRIOR CONSTRUCTION)

(SECOND PRIOR CONSTRUCTION)

(SECOND PRIOR CONSTRUCTION)

MAGNET WIRE BONDING METHOD AND BONDING STRUCTURE

BACKGROUND OF THE INVENTION

1. Field of the Invention

The present invention relates to a magnet wire bonding method and a bonding structure, and more particularly to a new improvement for ultrasonically bonding a longitudinal outer peripheral surface of a magnet wire having no entangling part to a flat surface of a flat part of a terminal pin.

2. Description of the Related Art

As magnet wire bonding methods and bonding structures of such a type conventionally used, the construction of Japanese Utility Model Application Publication No. S63-118509 as illustrated in FIGS. 7 and 8 and the construction currently marketed (no corresponding Patent Literature) by the applicant as illustrated in FIGS. 9 and 10 may be referred to.

That is, in FIG. 7, represented by reference numeral 1 is a magnetic sensor, and a plurality of lead terminals 9, 10, and 11 which are insert-molded are arranged with partially exposed in a lead terminal holder 3 of the magnetic sensor 1.

Bases 9a, 10a, and 11a of the lead terminals 9, 10 and 11 protrude in a recess 25 formed in the lead terminal holder 3.

A sensor element body 2 made of a substrate is provided above the recess 25. The sensor element body 2 includes a magnetic sensor layer 5 and copper conductive parts 7a, 7b and 7c arranged in parallel.

The bases 9a, 10a and 11a and the conductive parts 7a, 7b and 7c are connected to their respective magnetic sensors (not illustrated) of the magnetic sensor layer 5, and the conductive parts 7a, 7b and 7c are connected to the base ends 9a, 10a, and 11a, respectively, by magnet wires 13 such as copper or gold with a device (not illustrated) like a wire bonding machine required for manufacturing known semiconductor chips or the like.

In front of the sensor element body 2 of the magnetic sensor 1 described above and in close proximity to the sensor element body 2, a rotator 35 in which N poles and S poles are alternately magnetized is rotatably arranged.

In the sensor element body 2 of the lead terminal holder 3, which is illustrated as enlarged in FIG. 8, the tips or the rear ends of the magnet wires 13 are bonded to the respective conductive parts 7a, 7b and 7c and are bonded to the respective bases 9a, 10a, and 11a, so that their respective bonding states are spot welds T.

Further, as another conventional example, the construction which is currently marketed by the applicant but has no corresponding Patent Literature as illustrated in FIGS. 9 and 10 may be referred to.

It is noted that the configuration illustrated in FIGS. 9 and 10 will be described using the same reference numerals for identical or equivalent parts as those in FIGS. 7 and 8 described above.

In FIG. 9, represented by reference numeral 3 is a terminal pin holding part which is, for example, formed integrally with an annular insulating cover 31 of an annular stator 30 of a resolver to protrude. At the outermost positions of the terminal pin holding part 3, a plurality of terminal pins 11 are linearly arranged at predetermined intervals.

At positions in front of the respective terminal pins 11 provided on one surface 3A of the terminal pin holding part 3, a plurality of pins 20 for guide or slack are linearly provided in parallel with the respective terminal pins 11.

Furthermore, a pair of guide pins 21 is provided on the inner side from the respective pins 20 for guide or slack.

Inside the annular stator 30, a plurality of protruding magnetic poles 32 which protrude inward at predetermined angular intervals are provided. On the outer periphery of each protruding magnetic pole 32, the annular insulating cover 31, which are formed integrally with the terminal pin holding part 3, are provided.

An end wire 13 of a stator coil 13A for excitation and output wound around the corresponding protruding magnetic pole 32 is connected to the corresponding terminal pin 11 in an entangling manner via the corresponding guide pin 21 and the corresponding pin 20 for guide or slack.

FIG. 10 a cross-sectional view taken along a line A-A' of FIG. 9. In FIG. 10, the same parts as those described with reference to FIG. 9 are indicated by the same reference numerals and the description thereof will be omitted.

In the terminal pin 11 which is insert-molded in the terminal pin holding part 3 which is formed at one end 31a of the annular insulating cover 31, a pin part 11a which is formed at the tip end of the terminal pin 11 protrudes inside a space 3D of a connector part 3B of the terminal pin holding part 3.

Further, the other end 11b of the terminal pin 11 protrudes outside a bottom surface 3C of the terminal pin holding part 3.

SUMMARY OF THE INVENTION

The conventional magnet wire bonding method and the bonding structure thereof which are configured as described above has the following problems.

That is, in the first prior construction illustrated in FIGS. 7 and 8, the magnet wire 13 has the point joint T made by any one of soldering, TIG welding, and brazing to connect between the base 9a (10a, 11a) and the conductive part 7a (7b, 7c), and the point joint T may be in a poor connecting state in any process, thereby causing an increase in in-process defect and a deterioration in productivity.

Further, in the case of the second prior construction illustrated in FIGS. 9 and 10, the end wire 13 of the stator coil 13A wound around the protruding magnetic pole 32 is required to be entangled with the terminal pin 11 via the guide pins 20 and 21, and as a result, it takes long time to wind the wire and the number of equipment installed increases.

In addition, as described above, since the wire is entangled with the terminal pin via a number of pins, it is hard to entangle a short end wire in a resolver with a small diameter and it is also not easy to lay out the components properly.

Furthermore, there is a serious problem in that as illustrated in FIG. 10, the other end 11b of the terminal pin 11 protrudes from the bottom surface 3C of the terminal pin holding part 3, so that the other end 11b serves as an obstacle when a resolver illustrated in FIGS. 9 and 10 is connected to another device not illustrated, thereby making it difficult to configure connections.

The present invention has been made to solve the problems as described above, and in particular, an object of the present invention is to provide a magnet wire bonding method and a bonding structure adapted to ultrasonically bond a longitudinal outer peripheral surface of an end wire which is a magnet wire having no entangling part to a flat surface of a flat part of a terminal pin.

A magnet wire bonding method according to the present invention includes using a terminal pin having a flat plate part provided in a pin part as a terminal pin holding part; placing a magnet wire in a longitudinally spread state on a flat surface of the flat plate part without being entangled; and ultrasonically bonding an outer peripheral surface of the magnet wire to the flat surface with an ultrasonic horn. In the method, the terminal pin is insert-molded in a terminal pin holding part of a resolver or inserted into an attachment hole, and the flat plate part of the terminal pin is located inside from a bottom surface of the terminal pin holding part. In the method, the magnet wire is in contact with the flat surface along the same length as a flat-surface length of the flat plate part. In the method, a pin for guide or slack is provided at a position in front of the flat plate part of the terminal pin holding part, and an end wire after being wound around a protruding magnetic pole of an annular stator connected to the terminal pin holding part is used as the magnet wire to be ultrasonically bonded to the flat plate part. In the method, the magnet wire is bonded to the flat surface of the flat plate part in a longitudinally spread state along a surface direction of the flat surface. A magnet wire bonding structure according to the present invention includes a flat plate part formed on another end of a terminal pin provided in a terminal pin holding part; a magnet wire placed on the flat plate part and having no entangling part; and a bonding part at which the magnet wire is bonded to the flat plate part with a ultrasonic horn, wherein the magnet wire is bonded to a flat surface of the flat plate part in a longitudinally spread state along a surface direction of the flat surface. In the structure, the terminal pin is provided in a terminal pin holding part provided on one end of an annular insulating cover that covers an annular stator having a number of protruding magnetic poles, and the terminal pin includes a linear pin part and the flat plate part which is provided integrally or separately from the pin part. In the structure, the flat plate part is located inside from a bottom surface of the terminal pin holding part.

The magnet wire bonding method and the bonding structure according to the present invention are configured as described above can provide the following advantageous effects.

That is, by using a terminal pin having a flat plate part provided in a pin part as a terminal pin holding part, placing a magnet wire in a longitudinally spread state on a flat surface of the flat plate part without being entangled, and ultrasonically bonding an outer peripheral surface of the magnet wire to the flat surface with an ultrasonic horn, it is possible to strengthen the bonding between the magnet wire and the terminal pin and thus to allow the terminal pin to have a short length. Accordingly, as illustrated in FIG. 6, the thickness of a resolver stator can be reduced, and the diameter can also be reduced in the radial direction. As a result, the distance to the motor can be reduced. Further, the time of entangling on the terminal pin is reduced, thereby making it possible to reduce the number of winding machines installed. Further, the terminal pin is insert-molded in a terminal pin holding part of a resolver or inserted into an attachment hole, and the flat plate part of the terminal pin is located inside from a bottom surface of the terminal pin holding part, so that it is possible to greatly contribute to the reduction in thickness of the resolver stator.

Further, the magnet wire is in contact with the flat surface along the same length as a flat-surface length of the flat plate part, so that bonding between the end wire and the flat plate part can be ensured.

Further, a pin for guide or slack is provided at a position in front of the flat plate part of the terminal pin holding part, and an end wire after being wound around a protruding magnetic pole of an annular stator connected to the terminal pin holding part is used as the magnet wire to be ultrasonically bonded to the flat plate part, so that the number of pins for guiding the end wire can be significantly reduced as compared to the conventional one.

Further, the magnet wire is bonded to the flat surface of the flat plate part in a longitudinally spread state along a surface direction of the flat surface, so that it is possible to provide an increased bonding area between the end wire and the flat plane part.

DESCRIPTION OF THE PREFERRED EMBODIMENTS

A magnet wire bonding method and a bonding structure according to the present invention are to ultrasonically bond a longitudinal outer peripheral surface of a magnet wire having no entangling part to a flat surface of a flat part of a terminal pin.

Embodiments

Hereinafter, preferred embodiments of the magnet wire bonding method and the bonding structure according to the present invention will be described with reference to the drawings.

Figure 9:
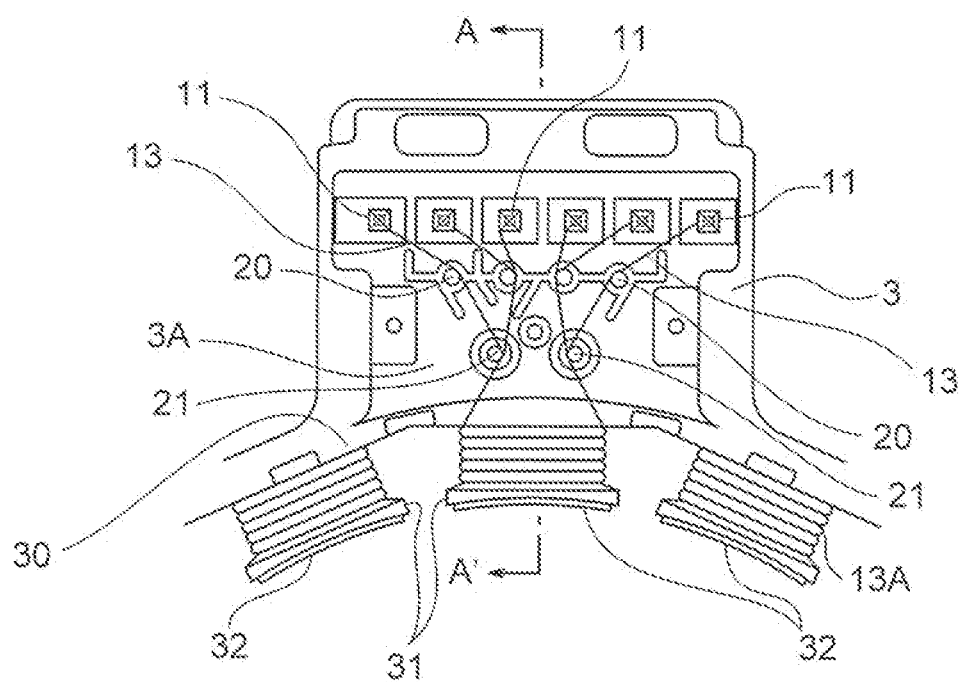
FIG. 9 is a plan view illustrating main parts of the prior art resolver stator.
Figure 10:
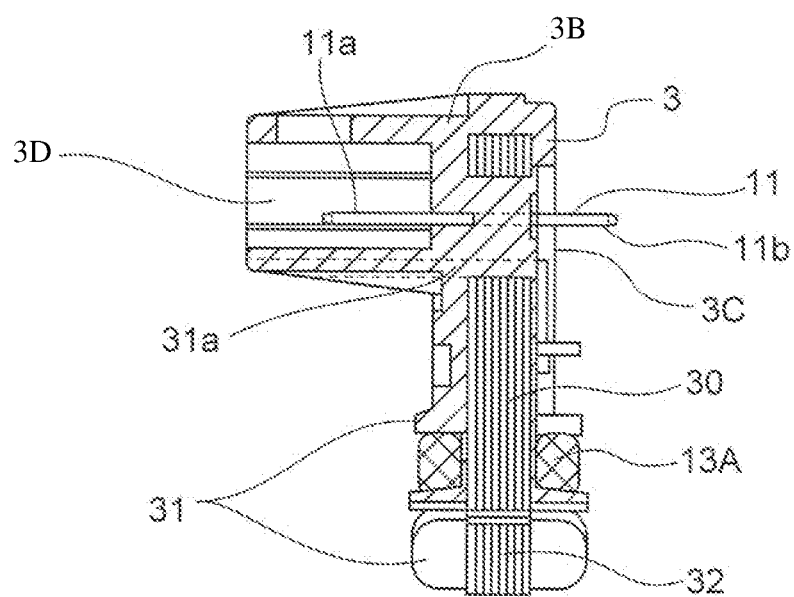
FIG. 10 is a cross-sectional view taken along a line A-A' of FIG. 9.

It is noted that the same or equivalent parts as in FIGS. 9 and 10 illustrating a prior art example will be described by using the same reference numerals.

Figure 1:
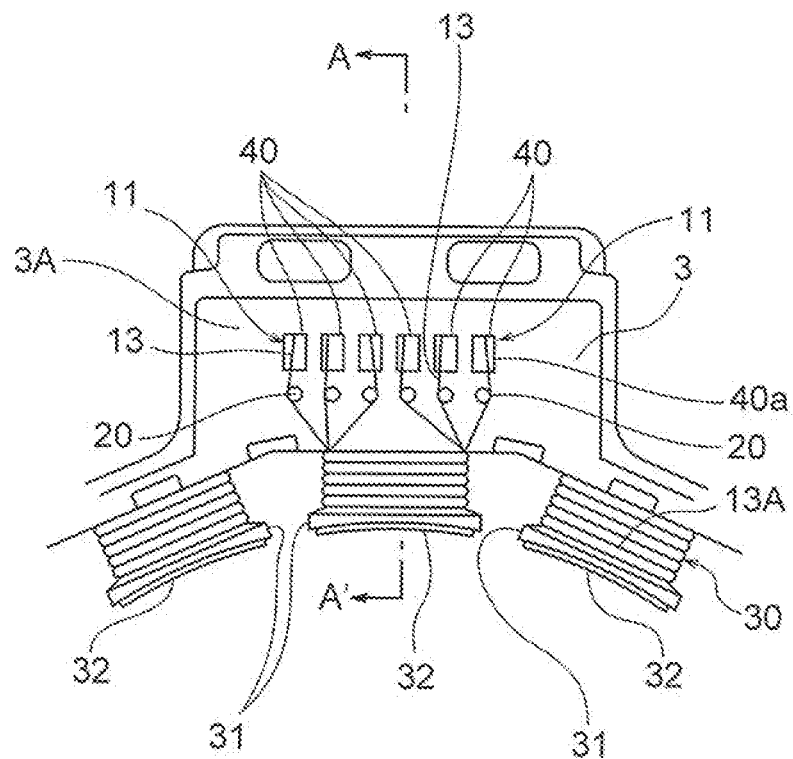
FIG. 1 is a plan view of an essential part illustrating a magnet wire bonding method and a bonding structure according to the present invention.

In FIG. 1, represented by reference numeral 3 is a terminal pin holding part which is, for example, formed integrally with an annular insulating cover 31 of an annular stator 30 of a resolver to protrude. At the outermost positions of the terminal pin holding part 3, a plurality of terminal pins 11 are linearly arranged at predetermined intervals. The terminal pin 11 is insert-molded in the terminal pin holding part 3 or inserted into an attachment hole which is provided, not illustrated.

At positions in front of the respective terminal pins 11 provided on one surface 3A of the terminal pin holding part 3, a plurality of pins 20 for guide or slack are linearly provided in parallel with the respective terminal pins 11.

Furthermore, on the inner side from the respective pins 20 for guide or slack, a plurality of protruding magnetic poles 32 each of which is wound with a stator coil 13A via the annular insulating cover 31 are provided to protrude inward.

A part of the annular insulating cover 31 protrudes outward in the radial direction to integrally form the terminal pin holding part 3.

The annular insulating cover 31 is integrally or separately configured with respect to the annular stator 30, as is well known.

Figure 3:
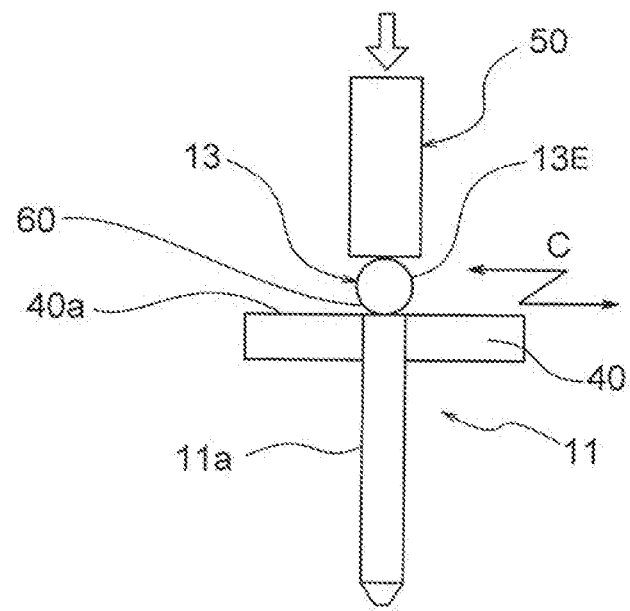
FIG. 3 is a structure diagram illustrating bonding of magnet wires in the present invention.
Figure 4:
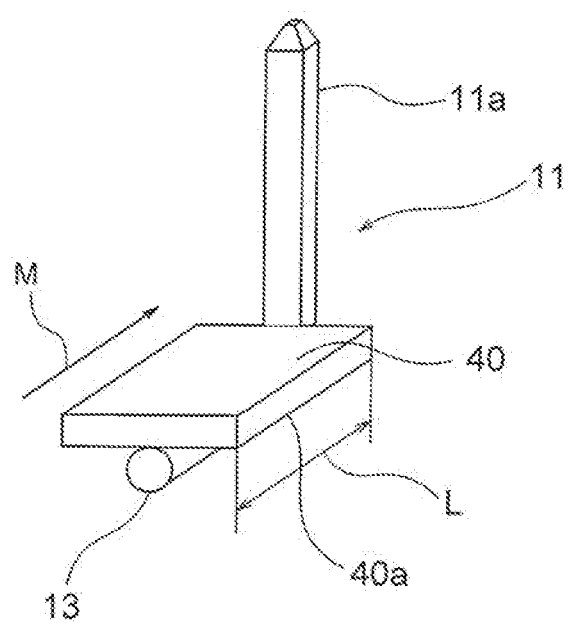
FIG. 4 is a perspective view of a terminal pin of FIG. 3.

As illustrated in FIGS. 3 and 4, end wires 13 of the stator coil 13A each of which is a magnet wire wound around the corresponding protruding magnetic pole 32 and serves as a wire for excitation or output are each integrally bonded to a flat surface 40a of a flat plate part 40 of the terminal pin 11 via a guide pin 21 or the corresponding pin 20 for guide or slack by ultrasonic bonding, not by entangling.

Figure 2:
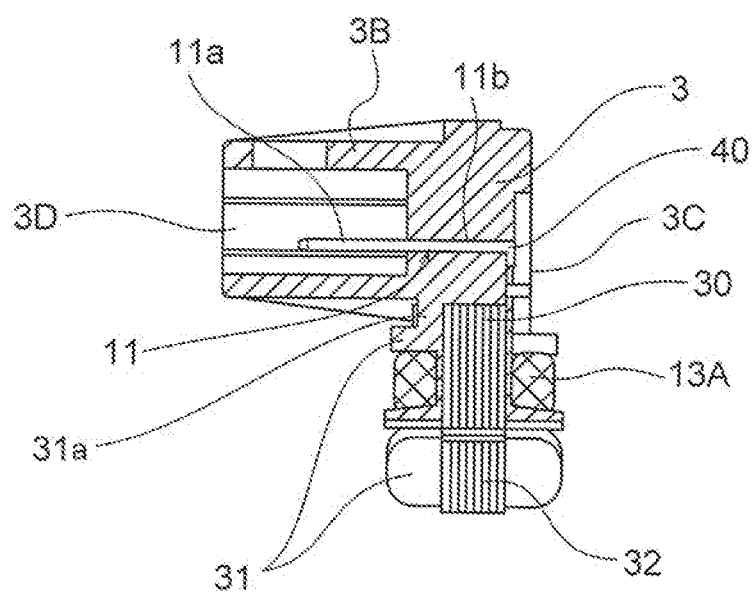
FIG. 2 is a cross-sectional view taken along a line A-A' of FIG. 1.

FIG. 2 is a cross-sectional view taken along the line A-A' in FIG. 1. In a space 3D of a connector part 3B formed in the terminal pin holding part 3, the terminal pins 11 are integrally provided by insert molding.

A pin part 11a of the terminal pin 11 is located in the space 3D. The flat plate part 40 provided on the other end 11b side is formed by bending the other end 11b into an L shape. The flat plate part 40 is located inside from a bottom surface 3C of the terminal pin holding part 3. It is noted that the flat plate part 40, which is L-shaped in FIG. 2, is directly bent from the flat plate part 40 in more detail as illustrated in FIGS. 3 and 4, and is also provided to be exposed with respect to the bottom surface 3C as illustrated in FIG. 2.

Further, as apparent from FIG. 2, the terminal pin holding part 3 is formed integrally with one end 31a of the annular insulating cover 31 therefrom.

FIG. 3 illustrates that the end wire 13 of the stator coil 13A, that is, the magnet wire is placed on the flat surface 40a of the flat plate part 40; a known ultrasonic horn 50 is placed on an outer peripheral surface 13E of the magnet wire 13 to press the outer peripheral surface 13E and vibrate the outer peripheral surface 13E in a vibration direction of ultrasonic waves indicated by an arrow C; and the magnet wire 13 is melted to form a bonding part 60 on the flat surface 40a. It is noted that the magnet wire 13 (i.e., the end wire) has a linear part only, but no entangling part as used in the prior art one.

At the time of the above-mentioned bonding, the longitudinal direction of the magnet wire 13 is arranged in the same direction as a surface direction M along a flat-surface length L of the flat plate part 40.

Figure 5:
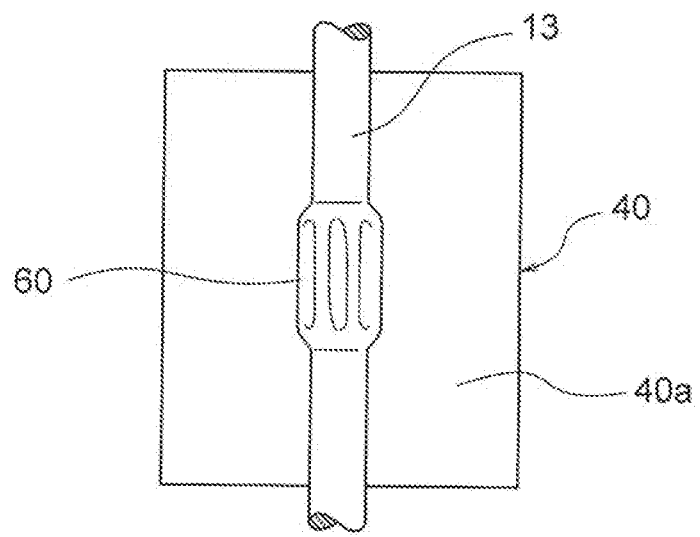
FIG. 5 is a plan view after the bonding in FIG. 3.
Figure 6:
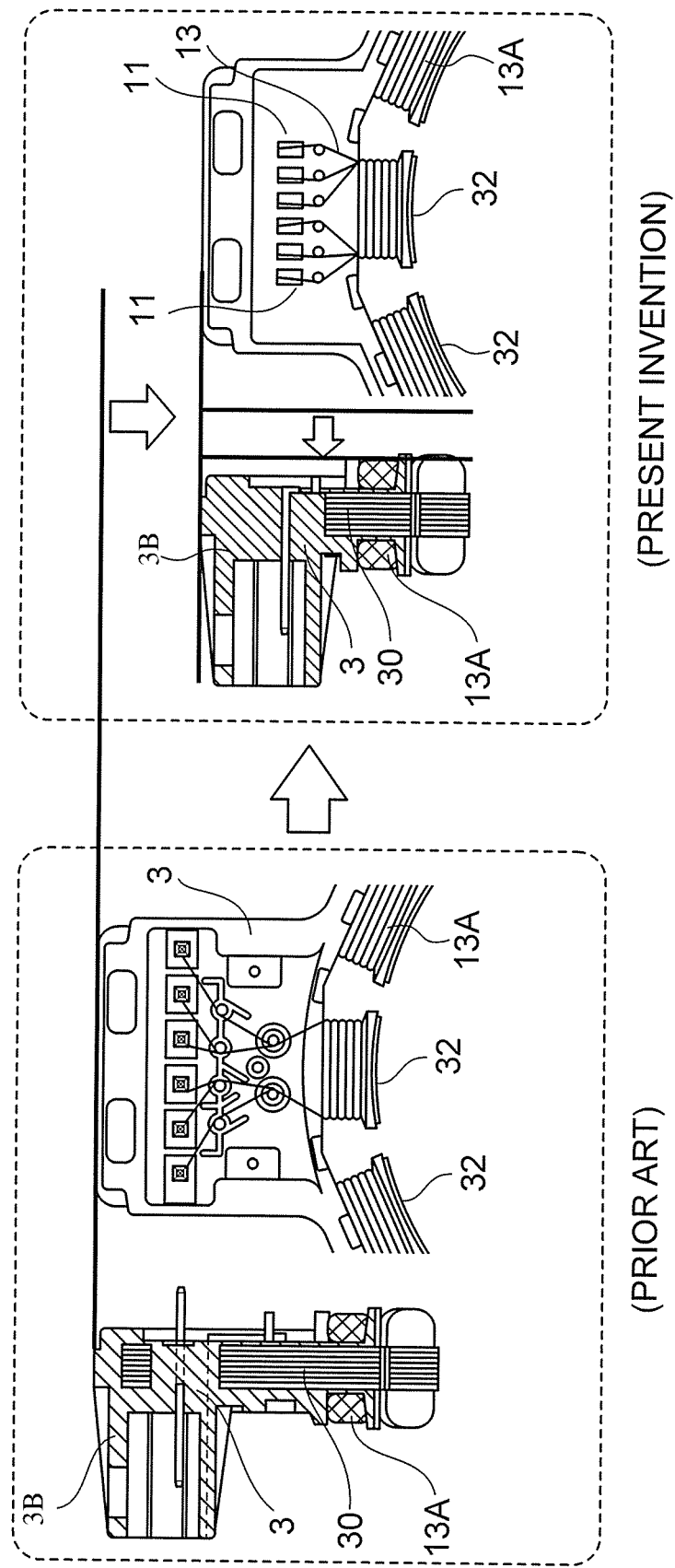
FIG. 6 is a comparison diagram illustrating main parts of resolver stators according to a prior art and the present invention.
Figure 7:
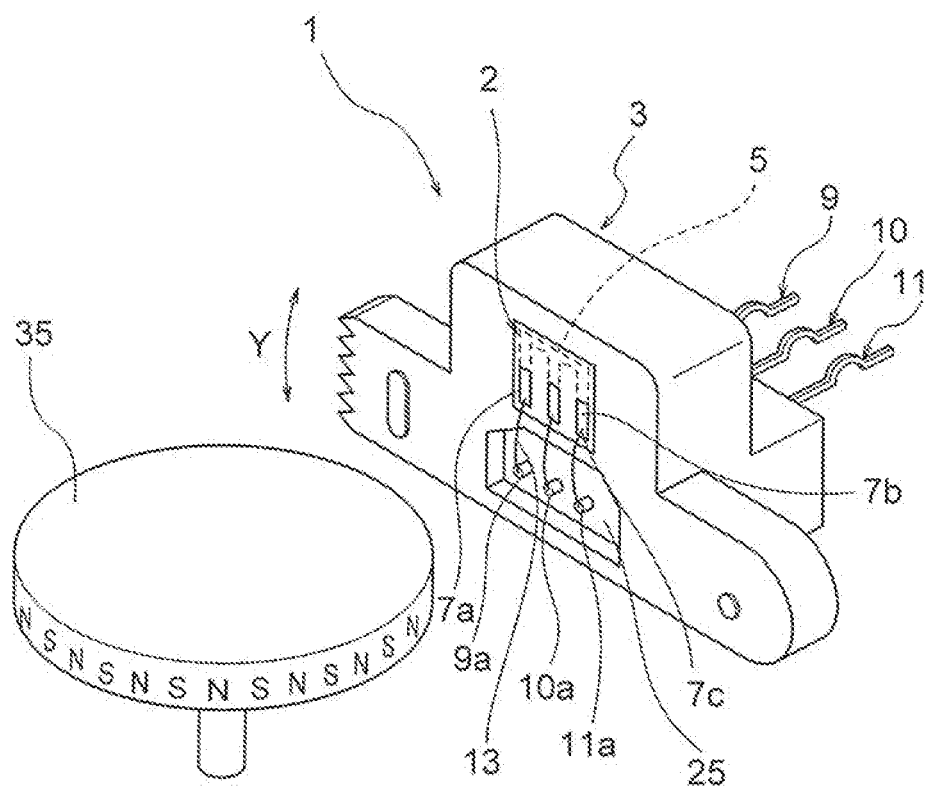
FIG. 7 is a structure diagram illustrating a prior art magnetic sensor.
Figure 8:
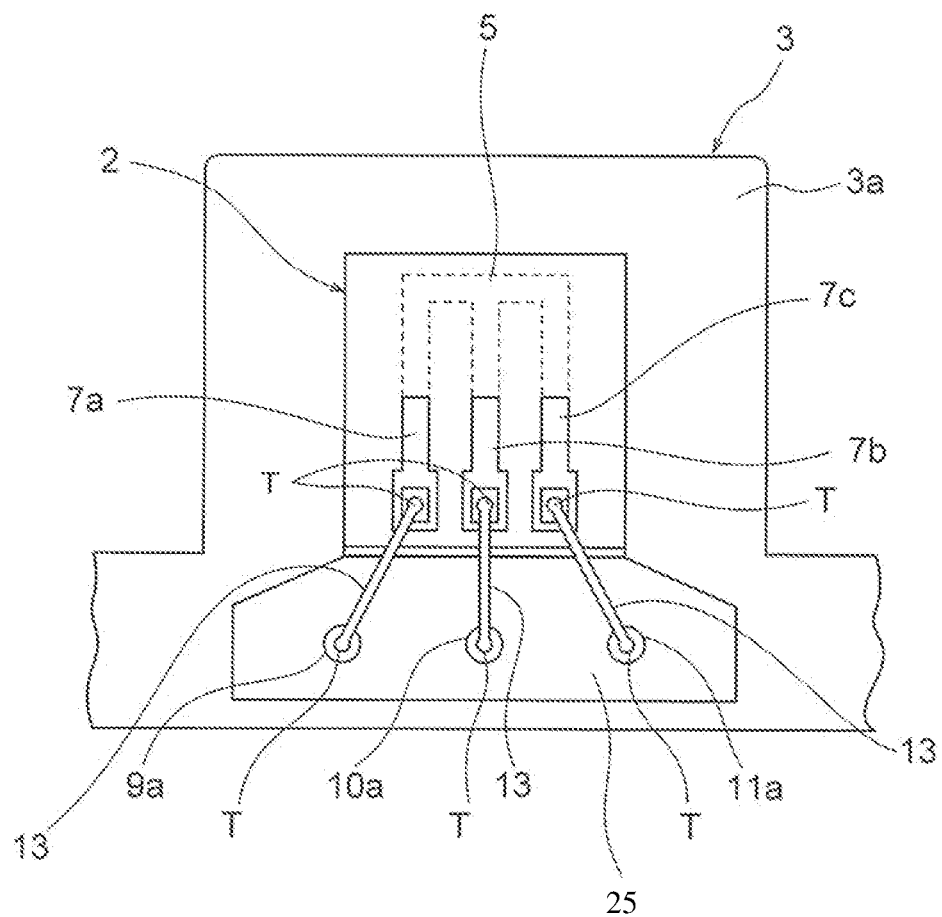
FIG. 8 is an enlarged view of main parts of FIG. 7.

FIG. 5 illustrates a state of the bonding part 60 by the above-described ultrasonic bonding.

FIG. 5 illustrates the case where the bonding part 60 is applied only to a small portion in the longitudinal surface direction M of the flat surface 40a of the flat plate part 40.

However, the bonding part 60 may be applied to a longer part to be formed by bonding in the flat-surface length L than the bonding part 60 illustrated in FIG. 5.

It is noted that in this case, the magnet wire 13 is in contact with the flat surface 40a along the same length as the flat-surface length L of the flat surface 40a of the flat plate part 40.

In the magnet wire bonding method and the bonding structure according to the present invention, by pressing the magnet wire with the ultrasonic horn in a state where the outer peripheral surface of the magnet wire is in contact with the flat surface of the flat plate part, the magnet wire is melted and bonded to the flat surface of the flat plate part. This makes free from work of entangling and welding the magnet wire in the conventional manner, thereby making it possible to provide an extremely easy bonding of this type of magnet wire to another member and improved productivity.

What is claimed is:

1. A magnet wire bonding structure, comprising:
    a terminal pin having a pin part at an end of the terminal pin;
    a flat plate part formed on another end of the terminal pin, the flat plate part being an L-shaped portion of the terminal pin;
    a terminal pin holding part having a connector part with a space therein;
    a magnet wire placed on the flat plate part and having no entangling part; and
    a bonding part at which the magnet wire is bonded to the flat plate part with an ultrasonic horn,
    wherein the magnet wire is bonded to a flat surface of the flat plate part in a longitudinally spread state along a surface direction of the flat surface,
    wherein the terminal pin is provided in the terminal pin holding part, the pin part of the terminal pin is positioned in the space of the connector part of the terminal pin holding part, the flat plate part is positioned inside the terminal pin holding part with respect to a bottom surface of the terminal pin holding part, and the L-shaped portion is exposed with respect to the bottom surface.

2. The magnet wire bonding structure according to claim 1, further comprising:
    an annular stator having a number of protruding magnetic poles, and
    an annular insulating cover that covers the annular stator, wherein the terminal pin includes a linear pin part,
    wherein the linear pin part and the flat plate part are provided integrally or separately from the pin part,
    wherein the terminal pin holding part is provided on one end on the annular insulating cover.

* * * * *